United States Patent
Chen

(10) Patent No.: US 8,416,588 B2
(45) Date of Patent: Apr. 9, 2013

(54) CONTROL CIRCUIT AND BULK DC/DC CONVERTER IN CONSTANT ON-TIME MODE

(75) Inventor: Chih-Yuan Chen, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 353 days.

(21) Appl. No.: 12/970,957

(22) Filed: Dec. 17, 2010

(65) Prior Publication Data

US 2012/0126766 A1 May 24, 2012

(30) Foreign Application Priority Data

Nov. 24, 2010 (TW) .............................. 99140512 A

(51) Int. Cl.
*H02M 3/335* (2006.01)
(52) U.S. Cl. ..................................... 363/21.14; 323/282
(58) Field of Classification Search .................. 323/222, 323/224–226, 271–272, 282–288, 351, 266–267; 363/17, 21.04, 21.11, 21.14, 65, 89, 97, 127, 363/80
See application file for complete search history.

(56) References Cited

U.S. PATENT DOCUMENTS

| | | | | |
|---|---|---|---|---|
| 6,559,624 B1 * | 5/2003 | Hong | ............................. | 323/280 |
| 7,088,078 B2 * | 8/2006 | Liu | ................................. | 323/207 |
| 7,508,180 B2 * | 3/2009 | Chen et al. | .................... | 323/282 |
| 8,183,842 B2 * | 5/2012 | Ni et al. | ........................ | 323/272 |
| 8,213,193 B2 * | 7/2012 | Ye | ................................. | 363/21.14 |

\* cited by examiner

*Primary Examiner* — Rajnikant Patel
(74) *Attorney, Agent, or Firm* — Winston Hsu; Scott Margo

(57) ABSTRACT

Constant on-time control circuit includes a comparing circuit including a comparator including a positive input end for receiving a control voltage; a negative input end for receiving a feedback voltage from the output voltage of the DC/DC converter; and an output end for outputting a comparing signal; and a voltage adjusting circuit coupled to the output end of the comparator for adjusting the control voltage; and a pulse generator coupled to the output end of the comparator for generating a pulse signal to control a switch set of the DC/DC converter according to the comparing signal.

10 Claims, 2 Drawing Sheets

CONTROL CIRCUIT AND BULK DC/DC CONVERTER IN CONSTANT ON-TIME MODE

BACKGROUND OF THE INVENTION

1. Field of the Invention

The present invention relates to a bulk DC/DC converter, and more particularly, to a bulk DC/DC converter in constant on-time mode.

2. Description of the Prior Art

Please refer to FIG. 1. FIG. 1 is a diagram illustrating a conventional bulk DC/DC converter 100. The bulk DC/DC converter 100 converts an input voltage source $V_{IN}$ to be an output voltage source $V_{OUT}$, wherein the voltage $V_{OUT}$ is lower than the voltage $V_{IN}$. As shown in FIG. 1, the DC/DC converter 100 comprises a control circuit 110, a switch set 120, an inductor L, an output capacitor $C_{OUT}$, and a voltage-dividing set 130. The switch set 120 comprises two switches $Q_1$ and $Q_2$. The voltage-dividing set 130 comprises two voltage-dividing resistors $R_{B1}$ and $R_{B2}$. The control circuit 110 comprises a comparator $CMP_1$, a pulse generator 111, and a drive circuit 112. The operation principles of the bulk DC/DC converter 100 are described as follows.

The control circuit 110 controls the operation of the DC/DC converter 100 by constant on-time manner. That is, when the control circuit 110 detects the output voltage $V_{OUT}$ is lower than a predetermined value, the switch $Q_1$ is turned on for a constant period of time (constant on-time) by the control circuit 110 (while the switch $Q_2$ is turned off) for allowing the input voltage source $V_{IN}$ conducting to the inductor L through the switch set 120.

During the operation of the DC/DC converter 100, the inductor L carries current $I_L$, and the current $I_L$ flows into the equivalent serial resistor $R_E$ of the output capacitor $C_{OUT}$ so that the resistor $R_E$ carries voltage $V_L$ reflecting the current $I_L$. As shown in FIG. 1, the waveform of the voltage $V_L$ is saw-toothed because the switch $Q_1$ is periodically turned on/off. The comparator $CMP_1$ receives the feedback voltage $V_{FB}$ divided from the voltage $V_L$ and the output voltage $V_{OUT}$ by the resistors $R_{B1}$ and $R_{B2}$, and compares with a reference voltage $V_{REF1}$, so as to determine when to turn on the switch $Q_1$. More specifically, when the voltage (feedback voltage $V_{FB}$) on the negative input end of the comparator $CMP_1$ is lower than the voltage (reference voltage $V_{REF1}$) on the positive input end of the comparator $CMP_1$, which means the output voltage $V_{OUT}$ is too low, and the switch $Q_1$ is needed to be turned on for allowing the input voltage source $V_{IN}$ to charge the inductor L and the output capacitor $C_{OUT}$, the comparator $CMP_1$ controls the pulse generator 111 to generate a pulse signal $P_{ON}$. When the pulse generator 111 is triggered by the comparator $CMP_1$, the pulse generator 111 generates a pulse signal $P_{ON}$ with a predetermined duration $T_P$ and predetermined logic. The drive circuit 112 controls the switch set 120 according to the pulse signal $P_{ON}$. More particularly, when the drive circuit 112 receives the pulse signal $P_{ON}$, the switch $Q_1$ is driven to turn on for the predetermined duration $T_P$. In addition, except in the dead time both of the switches $Q_1$ and $Q_2$ are turned off, when the switch $Q_1$ is turned on, the switch $Q_2$ is turned off; when the switch $Q_1$ is turned off, the switch $Q_2$ is turned on. In this way, the control circuit 110 controls the DC/DC converter 100 to operate regularly in constant on-time mode.

However, not all kinds of capacitors definitely have equivalent serial resistors, and because of the improvement to the manufacture of capacitors, the equivalent serial resistances of the capacitors become smaller, or even do not exist. For example, the multi-layer ceramic capacitor (MLCC) is very similar to an ideal capacitor and therefore the equivalent serial resistor does not exist on the MLCC. Consequently, when the MLCC is utilized as the output capacitor $C_{OUT}$, the resistor $R_E$ does not exist, and thus the information of the current $I_L$ cannot be informed to the control circuit 110, causing the control circuit 110 unable to control the DC/DC converter 100 according to the voltage $V_L$ effectively. The control circuit 110 is still able to operate by the feedback of the output voltage $V_{OUT}$. However, the phase of the output voltage $V_{OUT}$ is far behind the phase of the voltage $V_L$ because of the output capacitor $C_{OUT}$, which makes the control circuit 110 unable to react to the variation of the output voltage $V_{OUT}$ in time. For this reason, the DC/DC converter 100 is not able to operate stably in constant on-time mode while utilizing the MLCC as the output capacitor, causing inconvenience.

SUMMARY OF THE INVENTION

The present invention provides a control circuit in constant on-time mode for controlling a DC/DC converter, comprising a comparing circuit comprising a comparator comprising a positive input end for receiving a control voltage; a negative input end for receiving a feedback voltage divided from an output voltage of the DC/DC converter; and an output end for outputting a comparing signal; and a voltage adjusting circuit coupled to the positive input end of the comparator for adjusting the control voltage; and a pulse generator coupled to the output end of the comparator for generating a pulse signal according to the comparing signal for controlling a switch set of the DC/DC converter.

The present invention further provides a bulk DC/DC converter in constant on-time mode, comprising a switch set coupled between an input voltage source and ground; an inductor coupled to the switch set for receiving the input voltage source through the switch set; an output end coupled to the inductor for outputting an output voltage; an output capacitor coupled between the capacitor and the ground; a voltage-dividing set coupled between the output end and the ground for generating a feedback voltage according to the output voltage; and a control circuit, comprising a comparing circuit comprising a comparator comprising a positive input end for receiving a control voltage; a negative input end coupled to the voltage-dividing set for receiving the feedback voltage; and an output end for outputting a comparing signal; and a voltage adjusting circuit coupled to the positive input end of the comparator for adjusting the control voltage; and a pulse generator coupled to the output end of the comparator for generating a pulse signal according to the comparing signal so as to transmit the input voltage source to the inductor through the switch set.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
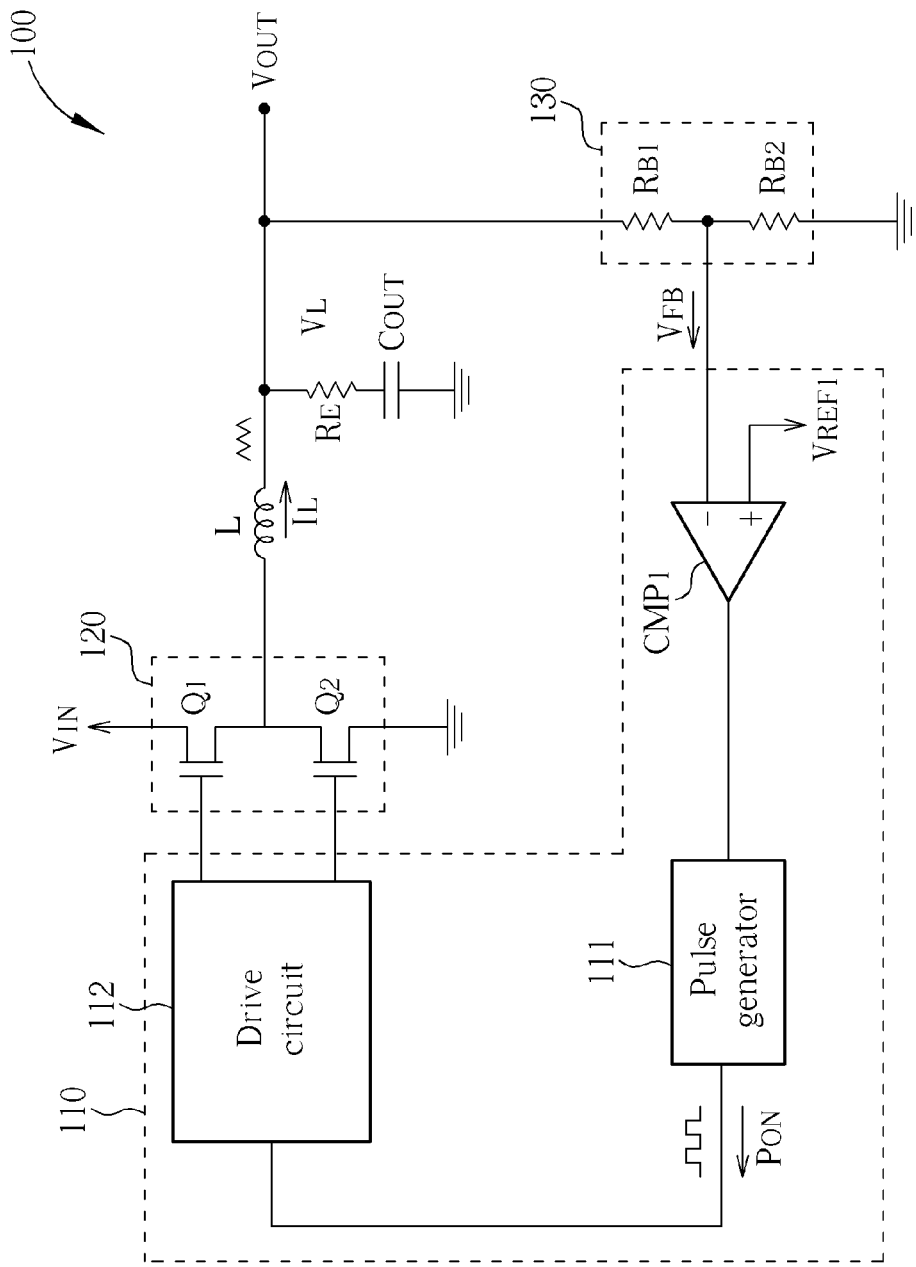
FIG. 1 is a diagram illustrating a conventional bulk DC/DC converter.
Figure 2:
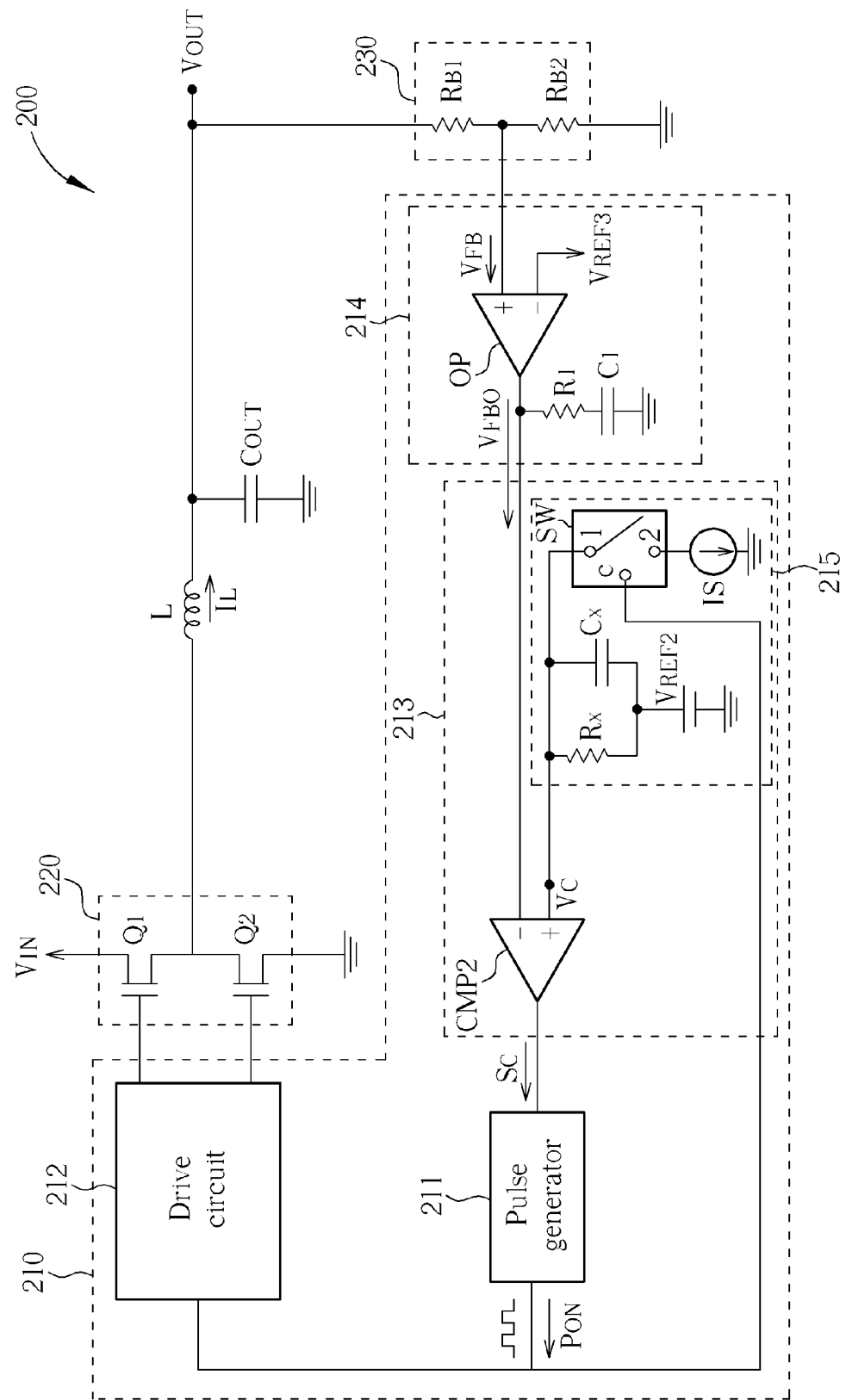
FIG. 2 is a diagram illustrating a bulk DC/DC converter of the present invention.

Please refer to FIG. 2. FIG. 2 is a diagram illustrating a bulk DC/DC converter 200 of the present invention. The bulk DC/DC converter 200 converts an input voltage source $V_{IN}$ to be an output voltage source $V_{OUT}$, wherein the voltage $V_{OUT}$ is lower than the voltage $V_{IN}$. As shown in FIG. 2, the DC/DC converter 200 comprises a control circuit 210, a switch set 220, an inductor L, an output capacitor $C_{OUT}$, and a voltage-dividing set 230. The switch set 220 comprises two switches $Q_1$ and $Q_2$. The voltage-dividing set 230 comprises two voltage-dividing resistors $R_{B1}$ and $R_{B2}$. The control circuit 210 comprises a pulse generator 211, a drive circuit 212, a comparing circuit 213, and an amplifying circuit 214. The comparing circuit 213 comprises a comparator $CMP_2$, and a voltage adjusting circuit 215. The voltage adjusting circuit 215 comprises a voltage reference source $V_{REF2}$, a constant current source IS, a switch SW, a resistor $R_X$, and a capacitor $C_X$. The amplifying circuit 214 comprises an amplifier OP, a voltage reference source $V_{REF3}$, a resistor $R_1$, and a capacitor $C_1$. The switch SW comprises a first end 1, a second end 2, and a control end C. It is noticeable that the output capacitor $C_{OUT}$ utilized in the DC/DC converter 200 is assumed to not have the equivalent serial resistor. The operation principles of the bulk DC/DC converter 200 are described as follows.

The control circuit 210 controls the operation of the DC/DC converter 200 by constant on-time manner. That is, when the control circuit 210 detects the output voltage $V_{OUT}$ is lower than a predetermined value, the switch $Q_1$ is turned on for a constant period of time (constant on-time) by the control circuit 210 (while the switch $Q_2$ is turned off) for allowing the input voltage source $V_{IN}$ conducting to the inductor L through the switch set 220.

Because the output capacitor $C_{OUT}$ used in the DC/DC converter 200 is assumed to have no equivalent serial resistor, the information about the current carried by the inductor L is not able to feed back to the control circuit 210. Thus, the control circuit 210 is designed to control the DC/DC converter 200 to operate regularly without the equivalent serial resistor.

In the amplifying circuit 214, the amplifier OP receives the feedback voltage $V_{FB}$ through the voltage-dividing set 230 dividing the output voltage $V_{OUT}$, and the received voltage $V_{FB}$ is amplified through the resistor $R_1$ and the capacitor $C_1$ to be the amplified feedback voltage $V_{FBO}$. In addition, the voltage reference source $V_{REF3}$ provides a reference voltage $V_{REF3}$.

In the comparing circuit 213, the comparator $CMP_2$ compares the control voltage ($V_C$) on its positive input end and the amplified feedback voltage $V_{FBO}$ on its negative input end, and accordingly outputs a comparing signal $S_C$. The voltage reference source $V_{REF2}$ provides a reference voltage $V_{REF2}$. Thus, the control voltage $V_C$ equals to the reference voltage $V_{REF2}$ before being adjusted by the voltage adjusting circuit 215, and is smaller than the reference voltage $V_{REF2}$ after being adjusted by the voltage adjusting circuit 215. More specifically, when the amplified feedback voltage $V_{FBO}$ is lower than the control voltage $V_C$, which means the output voltage $V_{OUT}$ is too low, and the switch $Q_1$ is needed to be turned on for allowing the input voltage source $V_{IN}$ to charge the inductor L and the output capacitor $C_{OUT}$, the comparator $CMP_2$ generates the comparing signal $S_C$ to trigger the pulse generator 211 to generate the pulse signal $P_{ON}$. When the pulse generator 211 is triggered by the comparator $CMP_1$, the pulse generator 211 generates a pulse signal $P_{ON}$ with a predetermined duration $T_P$ and predetermined logic. The drive circuit 212 controls the switch set 220 according to the pulse signal $P_{ON}$. More particularly, when the drive circuit 212 receives the pulse signal $P_{ON}$, the switch $Q_1$ is driven to turn on for the predetermined duration $T_P$ and the input voltage source $V_{IN}$ conducts through the turned-on switch $Q_1$ to charge the inductor L and the output capacitor $C_{OUT}$ for raising the output voltage $V_{OUT}$. Meanwhile, the pulse signal $P_{ON}$ controls the switch SW to turn on for conducting the constant current source IS for lowering the control voltage $V_C$. After the predetermined duration $T_P$ of the pulse signal $P_{ON}$, the switch SW is turned off so that the constant current source IS cannot discharge the resistor $R_X$ and the capacitor $C_X$. Instead, the voltage reference source $V_{REF2}$ charges the resistor $R_X$ and the capacitor $C_X$ for raising the control voltage $V_C$. By repeatedly executing the above actions, the control voltage $V_C$ can be of the saw-toothed waveform.

In other words, the inductor L starts to be charged at the beginning of the pulse signal $P_{ON}$ and the current $I_L$ increases, and the inductor L starts to be discharged at the end of the pulse signal $P_{ON}$ and the current $I_L$ decreases. Simply speaking, in the present invention, the pulse signal $P_{ON}$ is used to simulate the variation of the current $I_L$ on the inductor L and is fed back to the comparing circuit 213 to correspondingly adjust the control voltage $V_C$, i.e. the control voltage $V_C$ varies in response to the variation of the current $I_L$. In this way, the control circuit 210 is capable of stably controlling the DC/DC converter 200 without the equivalent serial resistor $R_E$.

To sum up, the control circuit of the present invention, by utilizing the pulse signal to simulate the change of the current on the inductor, is still capable of stably controlling the bulk DC/DC converter when there is no equivalent serial resistor, providing great convenience.

Those skilled in the art will readily observe that numerous modifications and alterations of the device and method may be made while retaining the teachings of the invention.

What is claimed is:

1. A control circuit in constant on-time mode for controlling a DC/DC converter, comprising: a comparing circuit comprising: a comparator comprising: a positive input end for receiving a control voltage; a negative input end for receiving a feedback voltage divided from an output voltage of the DC/DC converter; and an output end for outputting a comparing signal; and a voltage adjusting circuit coupled to the positive input end of the comparator for adjusting the control voltage; wherein the voltage adjusting circuit comprises: a first resistor coupled to the positive input end of the comparator; a first capacitor coupled to the positive input end of the comparator; a first voltage reference source coupled to the first resistor, the first capacitor, and ground; a first switch, comprising: a first end coupled to the positive input end of the comparator; a second end; and a control end coupled to the pulse generator for receiving the pulse signal; and a constant current source coupled to the second end of the first switch; and a pulse generator coupled to the output end of the comparator for generating a pulse signal according to the comparing signal for controlling a switch set of the DC/DC converter; the pulse generator coupled to the control end the first switch for transmitting the pulse signal to the control end of the first switch wherein the first end of the first switch conducts the second end of the first switch for allowing the constant current source to discharge the first resistor and the first capacitor in order to lower when the first switch receives the pulse signal.

2. The control circuit of claim 1, wherein the comparator outputs the comparing signal when the control voltage is higher than the feedback voltage.

3. The control circuit of claim 1, wherein duration of the pulse signal is fixed.

4. The control circuit of claim 1, further comprising a drive circuit coupled between the pulse generator and the switch set of the DC/DC converter for driving the switch set of the DC/DC converter according to the pulse signal.

5. The control circuit of claim 1, further comprising an amplifying circuit, comprising:
   an amplifier, comprising:
      a positive input end for receiving the feedback voltage;
      a negative input end coupled to a second voltage reference source for receiving a second reference voltage; and
      an output end coupled to the negative input end of the comparator for outputting the amplified feedback voltage;
   a second resistor coupled to the positive input end of the comparator; and
   a second capacitor coupled between the second resistor and the ground.

6. A bulk DC/DC converter in constant on-time mode, comprising: a switch set coupled between an input voltage source and ground; an inductor coupled to the switch set for receiving the input voltage source through the switch set; an output end coupled to the inductor for outputting an output voltage; an output capacitor coupled between the capacitor and the ground; a voltage-dividing set coupled between the output end and the ground for generating a feedback voltage according to the output voltage; and a control circuit, comprising: a comparing circuit comprising: a comparator comprising: a positive input end for receiving a control voltage; a negative input end coupled to the voltage-dividing set for receiving the feedback voltage; and an output end for outputting a comparing signal; and a voltage adjusting circuit coupled to the positive input end of the comparator for adjusting the control voltage; wherein the voltage adjusting circuit comprises: a first resistor coupled to the positive input end of the comparator; a first capacitor coupled to the positive input end of the comparator; a first voltage reference source coupled to the first resistor, the first capacitor, and the ground; a first switch, comprising: a first end coupled to the positive input end of the comparator; a second end; and a control end coupled to the pulse generator for receiving the pulse signal; and a constant current source coupled to the second end of the first switch; a pulse generator coupled to the output end of the comparator for generating a pulse signal according to the comparing signal so as to transmit the input voltage source to the inductor through the switch set; the pulse generator coupled to the control end the first switch for transmitting the pulse signal to the control end of the first switch wherein the first end of the first switch conducts the second end of the first switch for allowing the constant current source to discharge the first resistor and the first capacitor in order to lower when the first switch receives the pulse signal; a drive circuit coupled between the pulse generator and the switch set of the DC/DC converter for driving the switch set of the DC/DC converter according to the pulse signal; and an amplifying circuit, comprising: an amplifier, comprising: a positive input end for receiving the feedback voltage; a negative input end coupled to a second voltage reference source for receiving a second reference voltage; and an output end coupled to the negative input end of the comparator for outputting the amplified feedback voltage; a second resistor coupled to the positive input end of the comparator; and a second capacitor coupled between the second resistor and the ground.

7. The bulk DC/DC converter of claim 6, wherein the comparator outputs the comparing signal when the control voltage is higher than the feedback voltage.

8. The bulk DC/DC converter of claim 6, wherein duration of the pulse signal is fixed.

9. The bulk DC/DC converter of claim 6, wherein the switch set comprises:
   a third switch coupled between the input voltage source and the inductor; and
   a second switch coupled between the ground and the inductor;
   wherein when the pulse signal is generated, the third switch is turned on for transmitting the input voltage source to the inductor.

10. The bulk DC/DC converter of claim 6, wherein the output capacitor is a multi-layer ceramic capacitor (MLCC).

* * * * *